Nov. 28, 1961     E. A. DAHLE ET AL     3,010,544
AUTOMATIC VEHICLE DRUM BRAKE ADJUSTOR

Filed Nov. 6, 1958     2 Sheets-Sheet 1

INVENTORS
Edwin A. Dahle.
BY James O. Helvern

D. C. Staley
Their Attorney.

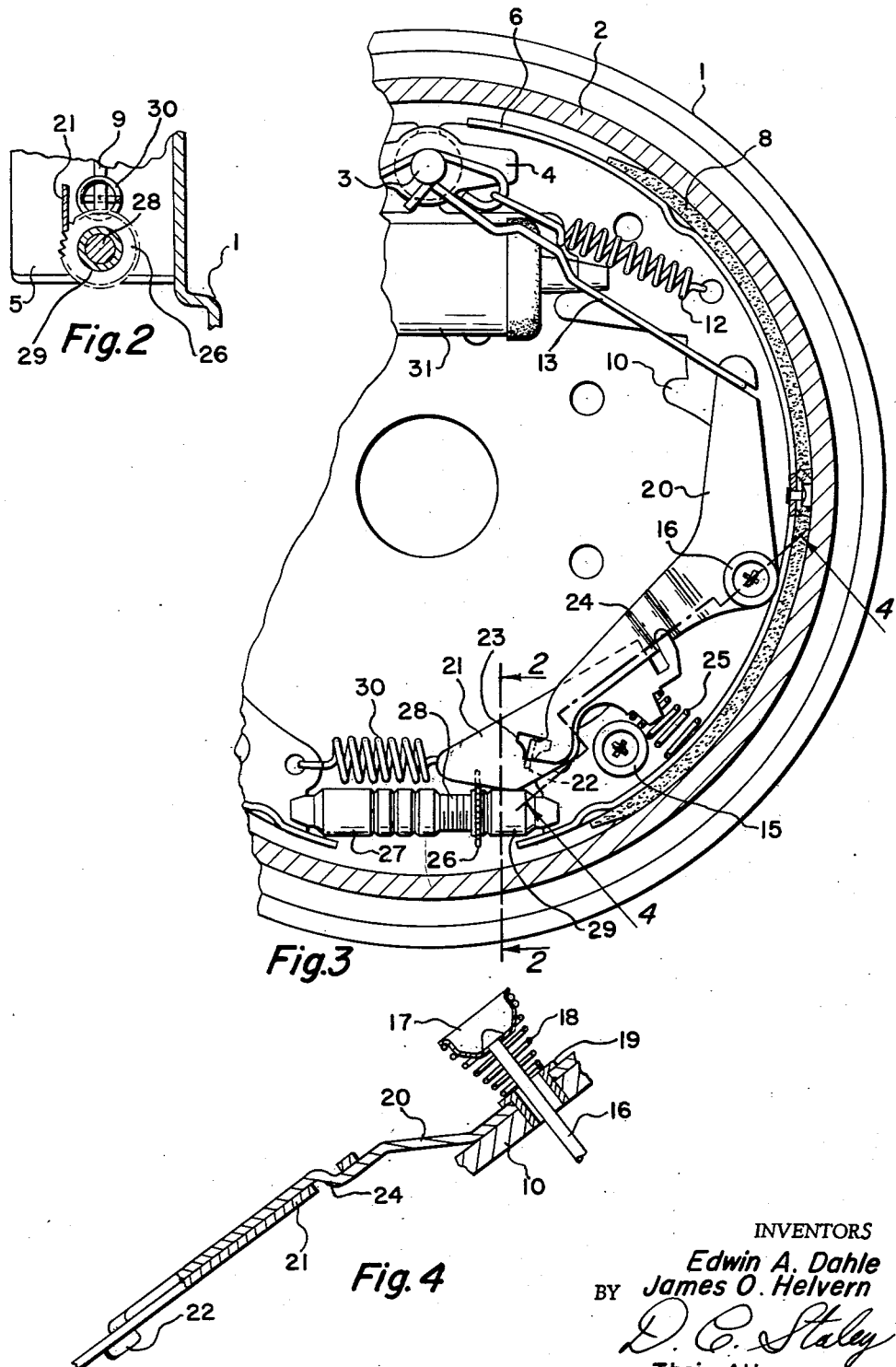

United States Patent Office 3,010,544
Patented Nov. 28, 1961

3,010,544
AUTOMATIC VEHICLE DRUM BRAKE
ADJUSTOR
Edwin A. Dahle, Dayton, and James O. Helvern, Lewisburg, Ohio, assignors to General Motors Corporation, Detroit, Mich., a corporation of Delaware
Filed Nov. 6, 1958, Ser. No. 772,359
7 Claims. (Cl. 188—79.5)

This invention relates to a vehicle drum brake and more particularly to an automatic adjustor for a vehicle drum brake.

Vehicle drum brakes require manual adjustment from time to time as they are being operated. This adjustment requires a need for the operator to have his brakes checked occasionally. This is an added expense and inconvenience which could be eliminated.

Various brake adjustors have been proposed which require a new type of braking structure in performing the automatic brake adjusting. In view of the fact that this requires added expense as well as redesigning of the braking structure, it would be well to provide an automatic brake adjustor to operate in conjunction with a conventional brake. This type of an adjustor would permit the use of a brake which has been proven through past performance to operate positively. This added mechanical feature of automatically adjusting a proven type of brake does not in any way hinder positive actuation of this type of brake.

It is an object of this invention to provide a vehicle drum brake adjustor which operates automatically during the braking cycle, and maintains a predetermined clearance between the shoes and drum.

It is a further object of this invention to provide an automatic vehicle drum brake adjustor to operate in conjunction with a conventional type of vehicle brake.

It is a further object of this invention to provide an automatic vehicle drum brake adjustor which operates when the vehicle brakes are being operated as the vehicle is moving rearward.

It is a further object of this invention to provide a brake adjustor which operates when the vehicle brakes are being operated as the vehicle is moving forward, this being accomplished by reversing the installation of the adjustor.

It is a further object of this invention to provide a brake adjustor for a vehicle drum brake which may be installed on a conventional brake. This type of brake adjustor provides the feature of simplicity of assembly and ease of installation with a vehicle drum brake.

It is a further object of this invention to provide a vehicle drum brake adjustor which incorporates the safety feature of preventing overadjustment of the vehicle brakes.

The objects of this invention are accomplished by means of a pivoting lever which is mounted on the webbing of a brake shoe. A connecting link is placed between the anchor pin of the vehicle brake to the one end of this lever. A pawl is mounted on the opposite end of this pivoting lever and is spring biased in the operating position on the pivoting lever. The end of the pawl extends to a point adjacent the ratchet wheel on the brake adjusting strut. As the brakes are actuated, the lever is pivoted due to a shifting movement of the brake shoe in relation to the backing plate and anchor pin. As the lever pivots, the pawl remains in a fixed position in relation to the pivoting lever and engages the ratchet wheel of the brake adjusting strut. Upon further pivoting movement of the pivoting lever, the pawl rotates the ratchet wheel and lengthens the adjusting strut.

The adjusting screw rotation is limited when the braking load on the screw becomes too great for the spring biased pawl to be effective. At this point, the lever and pawl no longer function in unison as the spring loaded pawl feature permits further lever movement without additional screw movement. The pawl then pivots at a point on the ratchet wheel and the opposite end moves outward against a spring positioned between the pawl and the brake shoe. The pivoting lever continues to rotate but its motion is ineffective in further adjusting the vehicle brake.

Further objects and advantages of the present invention will be apparent from the following description, reference being had to the accompanying drawings wherein a preferred embodiment of the present invention is clearly shown.

In the drawings:

FIG. 2 is a fragmentary cross-section view of the ratchet wheel and the engaging pawl. This view is taken on line 2—2 of FIG. 3.

FIG. 3 is a cross-section view of the vehicle drum brake similar to that of FIG. 1 except the brake adjustor is shown in a position when excessive force is created on the ends of the adjusting strut. The pawl is shown pivoted slightly away from the pivoting lever.

FIG. 4 is a fragmentary cross-section view showing part of the vehicle brake adjustor. The view is shown by line 4—4 in FIG. 3.

Figure 1:
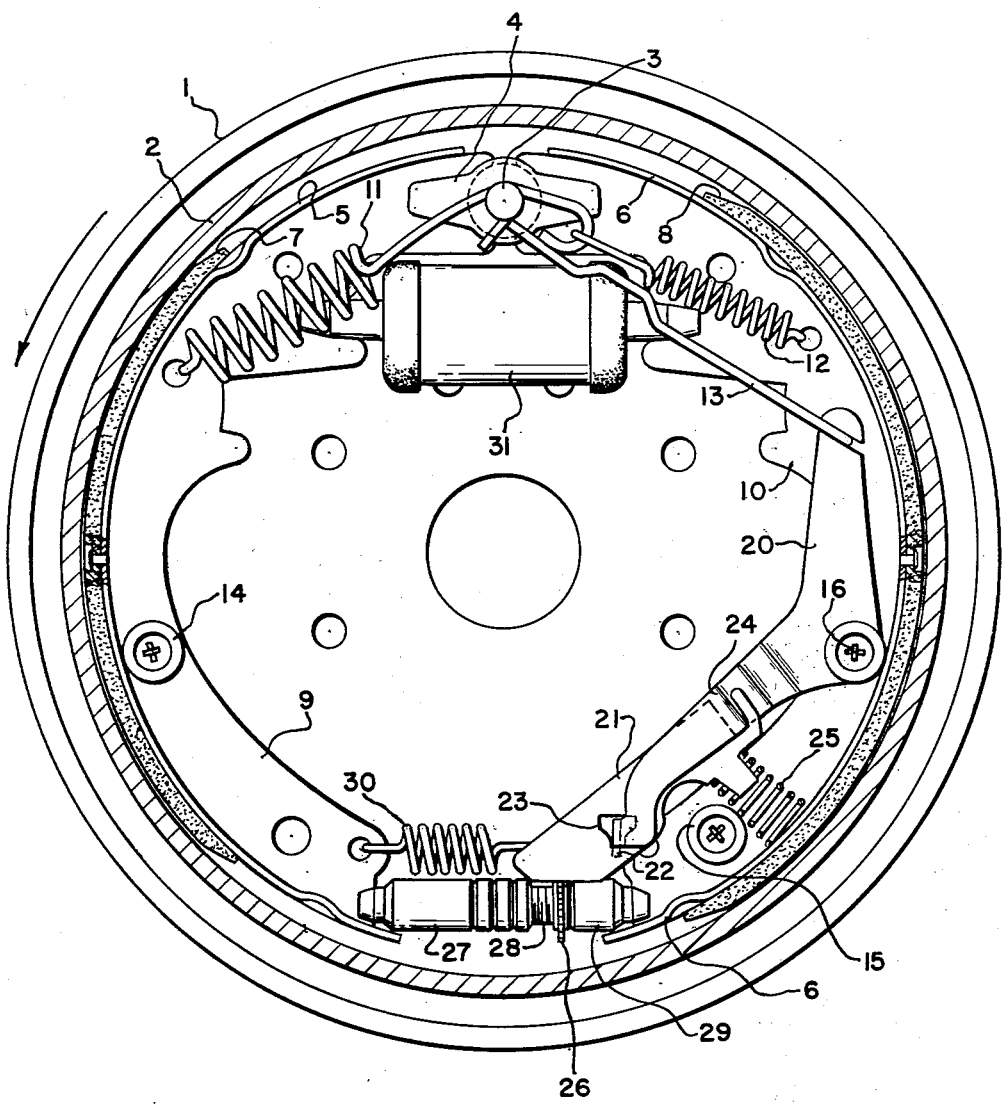
FIG. 1 is a cross-section view of a vehicle drum brake which illustrates the brake adjustor in position.

FIG. 1 illustrates the conventional vehicle drum brake and the brake adjustor mounted therein. The backing plate 1 is mounted adjacent to and concentric with the rotating drum 2. An anchor pin is shown at 3 and is directly connected to the backing plate 1. A washer 4 is mounted on the anchor pin 3 adjacent the shoe webbing of a primary shoe 5 and a secondary brake shoe 6. Friction material 7 is mounted on the primary shoe 5 and friction material 8 is mounted on the secondary shoe 6. The primary shoe webbing 9 and secondary shoe webbing 10 engage the anchor pin 3 at two of their cooperative adjacent ends. A return spring 11 is connected to the primary shoe webbing 9 and the anchor pin 3. Another return spring 12 is connected between the secondary shoe webbing 10 and a link 13 which is connected to the anchor pin 3. The shoe webbing is resiliently held in position in relation to the backing plate 1 by means of pin assemblies 14 and 15. Pin assembly 14 is used on the primary shoe webbing and pin assembly 15 is used on the secondary shoe webbing. A third pin assembly 16 is used which is shown in FIG. 4. This pin assembly 16 is shown in detail. The pin 16 extends from the backing plate through the brake shoe webbing and pivoting lever 20, and engages a cup-shaped member 17 on its upper end. A spring 18 resiliently holds the sleeve 19 in position. The sleeve 19 extends through the pivoting lever 20 and secondary brake shoe webbing 10 and provides for a pivoting movement of lever 20 in relation to the secondary shoe webbing 10.

The upper end of the pivoting lever 20 is directly connected to the anchor pin 3 by means of link 13. The lower end of the pivoting lever engages the pawl 21. In assembling the pivoting lever 20 and the pawl 21 the end portion 22 of the pivoting lever 20 is inserted through a hole 23 of the pawl member 21. Upon inserting this portion of the pivoting lever through the hole 23, the pawl is then rotated 90 degrees and the upper end of the pawl fits over an interlocking portion 24 of lever 20. As the pawl 21 and pivoting lever 20 are inserted into the brake assembly, a spring 25 is placed between the pawl and the secondary brake shoe 6. By this means of assembling the brake adjustor, it cannot be disassembled unless the pawl is pivoting outward against the spring and rotated 90 degrees. This, of course is not possible so long as the pivoting lever and pawl remain in the brake assembly. The only rotation in relation to each other which is permitted once they are assembled is that required to prevent overadjustment.

FIG. 2 shows the fragmentary cross-section view of the ratchet wheel and the engaging pawl. The adjusting screw 28 has a ratchet wheel 26 on its outer periphery which engages the pawl 21 as the pawl is pivoted by the pivoting lever 20.

The adjusting strut comprises 3 parts. The first part 27 is an internally threaded nut member which has a slot in its outer end for reception of the primary brake shoe webbing 9. This nut has a threaded hollow portion on the inner end for reception of the adjusting screw 28. The adjusting screw 28 has the ratchet wheel 26 mounted thereon. The opposite end of the adjusting screw 28 contains a cylindrical portion which is received in the socket 29. The opposite end of the socket 29 has a slotted portion for reception of the secondary brake shoe webbing 10. As the ratchet wheel 26 is rotated, the screw member elongates the adjusting strut. The strut spring 30 is resiliently connected between these two adjacent ends of the brake shoes. Between the opposite two adjacent ends of the brake shoes is operatively positioned a hydraulic wheel cylinder 31.

The automatic vehicle drum brake adjustor operates in this manner. As the brakes are actuated, the hydraulic wheel cylinder 31 forces shoe 5 and shoe 6 outward against the brake drum 2. The adjustor is intended to operate when the vehicle is moving in the rearward direction. The arrow of FIG. 1 indicates forward rotation of the drum for forward movement of the car.

As the friction material 8 of the shoe 6 engages the drum 2, the shoe 6 rotates slightly in a clockwise direction away from the anchor pin 3. This rotative motion is carried through the adjusting strut to the opposite shoe until this opposite shoe 5 shifts against the anchor pin 3. This rotative movement of the brake shoes within the brake drum creates a movement of the brake shoe webbing 10. As the shoe webbing 10 moves circumferentially within the brake drum 2, the connecting link 13 remains anchored to the anchor pin 3. The pivoting lever 20 connected to link 13 then pivots about its pivot point of sleeve 19. As the lever 20 pivots about sleeve 19, the opposite end of this lever carries a pawl 21 which operates with the lever 20 as a single unit. The lower end of the pawl 21 then engages the ratchet wheel 26. If the brake is in need of adjustment, the ratchet 26 will be rotated by the pawl member 21. As the ratchet wheel rotates, it carries the screw member 28 as these two parts operate as a unit. This movement by the pawl against the ratchet wheel 26 provides for the proper brake adjustment by advancing the screw member 28 to reduce the brake clearance. The clearance is a function of the pawl travel and the ratchet wheel tooth spacing. When the brakes are released, the pivoting lever 20 returns to its normal position and the pawl member returns to its normal position adjacent the ratchet 26.

An additional feature prevents over adjustment, and loss of brake effectiveness. In the event that the brakes are sufficiently adjusted when this operating cycle is performed, a large force will exist between the primary and secondary brake shoes 5 and 6. This force is transmitted through the adjusting strut which includes the nut 27, screw 28, and socket 29. The excessive friction developed on the screw member 28 and socket 29 will retard rotation of the ratchet wheel 26. This, in turn, will prevent the pawl member 21 from continuing to pivot as a unit with the pivoting member 20. The pawl member will pivot relative to lever 20. Since the pawl member is stopped at the point of contact between the pawl and the ratchet wheel 26, the pawl member moves outward away from the pivoting lever at the point where the pawl member fits over the interlocking portion 24 of the pivoting lever 20, against the spring 25. Regardless of the continued rotation of the pivoting lever, the pawl member will not further adjust the vehicle brake adjusting strut. For this reason the vehicle brakes cannot be overadjusted.

While the embodiment of the present invention as herein disclosed constitutes a preferred form, it is to be understood that other forms might be adopted.

We claim:

1. In a vehicle drum brake comprising in combination, a backing plate having an anchor pin, a vehicle brake drum, two brake shoes for frictionally engaging said brake drum and having cooperative adjacent ends, two of said cooperative adjacent ends resting against said anchor pin in their normal position, a hydraulic wheel cylinder operatively placed between said two cooperative adjacent ends, an adjustable strut between the opposite two cooperative adjacent ends of said brake shoes and having a ratchet wheel, a lever pivotally mounted on one of said brake shoes and carrying a pawl member which extends to a point adjacent the ratchet wheel of said adjustable strut, a spring biasing member disposed between said pawl member and said brake drum biasing said lever and said pawl to rotate about a common pivot point, a connecting link between the opposite end of said pivoting lever and said anchor pin, said link rotating said pivoting lever to provide adjustment of said brake shoes when said brakes are actuated.

2. In a vehicle drum brake comprising in combination a backing plate having an anchor pin, a brake drum mounted adjacent to said backing plate, two brake shoes for frictionally engaging said drum and having cooperative adjacent ends, said anchor pin disposed between two of said cooperative adjacent ends for said brake shoes, resilient means for returning said brake shoes to a rest position on said anchor pin, a hydraulic wheel cylinder operatively engaging said two cooperative adjacent ends of said brake shoes, an adjustable strut carrying a ratchet wheel between the opposite two cooperative adjacent ends of said brake shoes, a resilient member for maintaining said two opposite cooperative adjacent ends of said brake shoes in a normal position contacting said adjustable strut, an automatic adjusting device pivotally mounted on the central portion of one of the said brake shoes with a pivot point positioned integral with a brake shoe pin assembly said automatic adjusting device including, a connecting link connecting said anchor pin on one end, a pivoting lever carrying a pawl member connected to said link and pivotally mounted on said brake shoe pin assembly, said pawl member receiving said pivoting lever in a slot in its central portion, said pawl member and said pivoting lever provided with an interlocking portion on one end of said pawl member, said interlocking means accomplished by inserting said pivoting lever in said slot in said pawl member and then rotating said pawl member 90° relative to said pivoting lever, a spring mounted between said pawl member and said brake shoe for biasing said pawl member and said pivoting member in a unitary position and rendering said pawl member inoperative when said vehicle brakes have the desired adjustment, said pawl member extending to a point adjacent to said ratchet wheel on said adjusting strut to provide for an adjustment of said strut upon actuation of said brakes and prevent overadjustment of said brakes.

3. In a vehicle drum brake comprising in combination, a backing plate having an anchor pin, a rotating drum mounted adjacent to said backing plate, two brake shoes for frictionally engaging said drum and having cooperative adjacent ends, said anchor pin disposed between two of said operative adjacent ends of said brake shoes, resilient means for returning said brake shoes to a rest position on said anchor pin, hydraulic wheel cylinder operatively engaging said two cooperatively adjacent ends of said brake shoes, an adjustable strut having a ratchet wheel for operating an adjusting screw positioned between the opposite two cooperative adjacent ends of said brake shoes, a resilient member for maintaining said two opposite cooperative adjacent ends of said brake shoes in a normal position against said adjustable strut, an automatic adjusting device pivotally mounted on one of said brake shoes including, a pivoting lever forming the portion which is pivotally mounted on said brake shoe, a link member connecting one end of said pivoting lever to said anchor pin, a pawl member mounted on the opposite end of said pivoting lever and held in position on said pivoting lever by means of a locking portion and an interlocking end of said pawl member, a pawl spring mounted between said brake shoe and said pawl member biasing said pawl member in a locking position with said pivoting lever so that said pawl member and said pivoting lever operate as a unitary structure, said pawl member extending to a point adjacent to the ratchet wheel of said adjusting strut to provide adjustment of said strut upon actuation of said brakes, said interlocking portion and pawl spring providing a means for prevention of overadjustment by permitting individual pivoting of said pivoting lever and said pawl member as said pawl member pivots at a point adjacent to said ratchet wheel thereby rendering further pivoting movement of said pivoting lever inoperative in further adjusting said vehicle brakes.

4. In a vehicle drum brake comprising in combination, a backing plate having an anchor pin, a rotating brake drum mounted adjacent to said backing plate, two brake shoes for frictionally engaging said drum and having cooperatively adjacent ends, said anchor pin disposed between two of said cooperatively adjacent ends of said brake shoes, resilient means for returning said brake shoe to a rest position of said anchor pin, a vehicle hydraulic wheel cylinder cooperative engaging said two operatively adjacent ends of said two brake shoes, an adjustable strut carrying a ratchet wheel directly connected to a screw member for adjusting said vehicle brakes and operatively positioned between the opposite two cooperatively adjacent ends of said brake shoe, a strut spring member for maintaining said two opposite cooperative adjacent ends of said brake shoes in a normal position against said adjustable strut, automatic adjusting device including a pivoting lever pivotally mounted on one of said brake shoes, a connecting link connecting an anchor pin and one end of said pivoting lever, the opposite end of said pivoting lever inserted in a slot of a pawl member, said pivoting lever provided with an interlocking means for receiving one end of said pawl member, a pawl spring positioned between one of said brake shoes and said pawl member thereby providing a means for biasing said pawl member to operate as a unitary structure with said pivoting lever, said opposite end of said pawl member extending to a point adjacent to the ratchet wheel of said adjusting strut, said pawl member thereby rotating said ratchet wheel and screw member to adjust said brake portion when said brakes are operated, said interlocking means of said pawl member, said pivoting lever, and said pawl spring providing a means for preventing overadjustment of said brake shoes by permitting said pawl member to pivot at a point adjacent to said ratchet wheel instead of pivoting in unison with said pivoting lever.

5. In the vehicle drum brake comprising in combination, a backing plate having an anchor pin, a vehicle brake drum, two brake shoes frictionally engaging said brake drum and having cooperative adjacent ends, a wheel cylinder operatively placed between two of said cooperative adjacent brake shoe ends, said two cooperative adjacent brake shoe ends resting against said anchor pin in response to said spring biasing members connecting said brake shoes to said anchor pin, an adjustable strut carrying a ratchet wheel positioned between the opposite two cooperative adjacent ends of said brake shoes, an automatic brake adjusting device including, a pivoting lever mounted on one of said brake shoes, a connecting link connecting said anchor pin with said pivoting lever, a pawl carried on said pivoting lever, a slot in said pawl, a projecting portion of said pivoting lever received within said slot of said pawl providing a self-locking means between said pivoting lever and said pawl, a resilient member engaging said one brake shoe and said pawl biasing said pawl to a position of common rotation about the axis of rotation of said pivoting lever, said resilient member permitting said pawl member to rotate about a second center to prevent over adjustment of said brakes when said brakes are actuated.

6. In a vehicle drum brake comprising in combination, a backing plate having an anchor pin, a drum, two brake shoes for frictionally engaging said drum and having cooperative adjacent ends, said anchor pin disposed between two of said cooperative adjacent ends of said brake shoes, resilient means for returning said brake shoes to a resting position on said anchor pin, a wheel cylinder operatively engaging said two cooperative adjacent ends of said brake shoes, an adjustable strut carrying a ratchet wheel between the opposite two cooperative adjacent ends of said brake shoes, a resilient member for maintaining said two opposite cooperative adjacent ends of said brake shoes in a normal position against said adjustable strut, an automatic adjusting device including a lever pivotally mounted on one of said brake shoes, a connecting link connecting said lever to said anchor pin, a pawl member, said pivoting lever having a portion inserted in a slot of said pawl member, means to allow rotation of said pawl member to lock said pawl member and said pivoting lever in a unitary position upon assembly, a spring between said pawl member and said one brake shoe for retaining said pawl member and said pivoting lever in a unitary position, said pawl member extending to a point adjacent the ratchet wheel of said adjusting strut to provide adjustment of said strut upon actuation of said brakes.

7. In a vehicle drum brake comprising in combination a backing plate with an anchor pin, a drum mounted adjacent to and concentric to said backing plate, two brake shoes for operatively engaging said drum and having cooperative adjacent ends, a hydraulic wheel cylinder operatively positioned between two of said cooperative adjacent ends of said brake shoes, an adjustable screw having ratchet means positioned between the opposite two cooperative adjacent ends of said brake shoes, an automatic brake adjusting device including, a two piece pivoting lever pivotally mounted on one of said brake shoes, a connecting link connecting the first piece of said two piece pivoting lever and said anchor pin, locking means on said two pieces of said pivoting lever preventing lateral relative movement between the two pieces of said two piece pivoting lever, resilient means engaging said one brake shoe and the second piece of said pivoting lever restraining the relative rotational movement of the two pieces of said two piece lever, said second piece of said two piece lever extending to a position adjacent to said ratchet wheel of said adjusting screw providing screw rotation and brake adjustment by rotation of said two pieces of said two piece lever about a common center, said resilient means permitting rotation of said second piece about a second center when said vehicle brake is sufficiently adjusted and preventing over adjustment when said vehicle brakes are actuated.

References Cited in the file of this patent

UNITED STATES PATENTS

| | | |
|---|---|---|
| 1,954,540 | Sanford | Apr. 10, 1934 |
| 2,066,077 | Sanford et al. | Dec. 29, 1936 |
| 2,264,454 | Para | Dec. 2, 1941 |
| 2,292,018 | Smith | Aug. 4, 1942 |
| 2,301,272 | Goepfrich | Nov. 10, 1942 |
| 2,938,610 | Dombeck et al. | May 31, 1960 |

FOREIGN PATENTS

| | | |
|---|---|---|
| 779,890 | Great Britain | July 24, 1957 |